United States Patent [19]

Sue et al.

[11] Patent Number: 4,560,990
[45] Date of Patent: Dec. 24, 1985

[54] RECORDING PAPER FEEDING APPARATUS

[75] Inventors: Takaji Sue, Atsugi; Masatoshi Sugie, Zama, both of Japan

[73] Assignee: Richo Company, Ltd., Tokyo, Japan

[21] Appl. No.: 527,800

[22] Filed: Aug. 30, 1983

[30] Foreign Application Priority Data

| Aug. 31, 1982 [JP] | Japan | 57-132527[U] |
| Aug. 31, 1982 [JP] | Japan | 57-152028 |
| Aug. 31, 1982 [JP] | Japan | 57-152029 |
| Nov. 16, 1982 [JP] | Japan | 57-173750[U] |

[51] Int. Cl.⁴ ......................................... G01D 15/28
[52] U.S. Cl. ........................................ 346/17; 83/208; 83/250; 83/364; 346/24; 346/76 PH; 346/136; 358/304; 400/621
[58] Field of Search ................. 358/304; 346/24, 136, 346/76 PH, 17; 355/13; 226/186, 187, 181, 190, 193, 100; 83/208, 209, 210, 211, 250, 251, 364; 400/621-621.2

[56] References Cited

U.S. PATENT DOCUMENTS

| 2,085,904 | 7/1937 | Freese | 226/187 |
| 3,282,486 | 11/1966 | De Moss | 226/186 X |
| 3,413,915 | 12/1968 | Goodwin | 226/181 X |
| 3,779,641 | 12/1973 | Hauck | 355/13 |
| 3,951,023 | 4/1976 | Ashburner | 355/13 X |
| 4,115,817 | 9/1978 | Suzuki | 358/304 X |
| 4,122,497 | 10/1978 | Suzuki | 358/304 |
| 4,442,460 | 4/1984 | Kurata | 346/76 PH X |

*Primary Examiner*—Joseph W. Hartary
*Attorney, Agent, or Firm*—Oblon, Fisher, Spivak, McClelland & Maier

[57] ABSTRACT

A recording paper feeding apparatus for use in a recording machine such as a facsimile machine includes a predetermined paper travelling path along which a recording head, a platen roller, a cutter and a paper discharging roller are disposed. In one form of the present invention, a first detector for detecting presence and absence of the recording paper is disposed upstream of the recording head and a second detector for detecting presence and absence of the recording paper is disposed downstream of the cutter. And, signal sound is produced when both of the detectors detect presence of the paper, indicating that the paper is properly loaded. In another form, a switch is provided and if at least one of the detectors is detecting absence of the paper when the switch is actuated, alarm sound is produced, indicating that the paper is not properly loaded.

16 Claims, 21 Drawing Figures

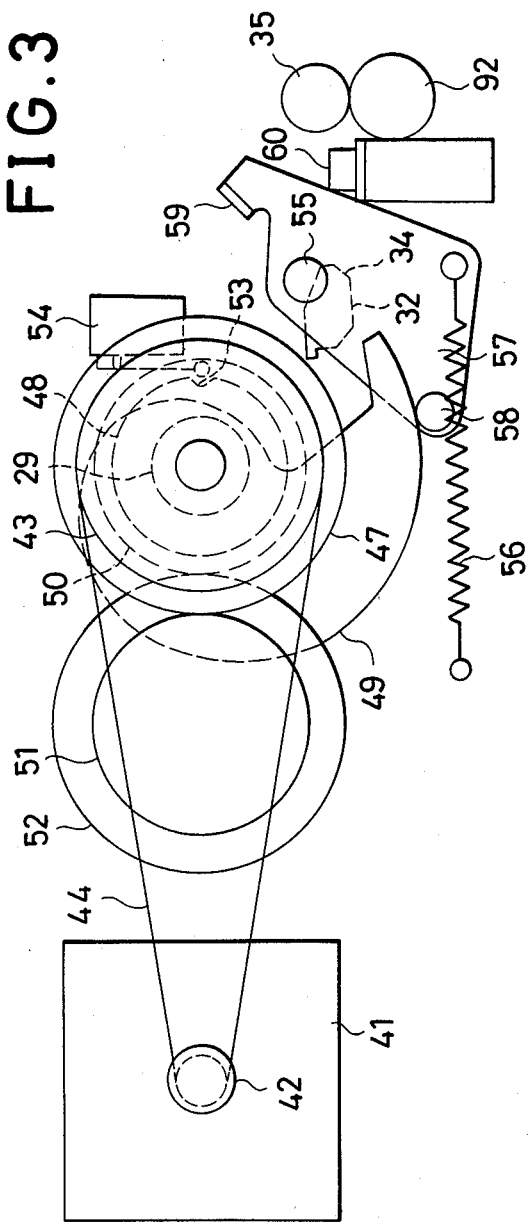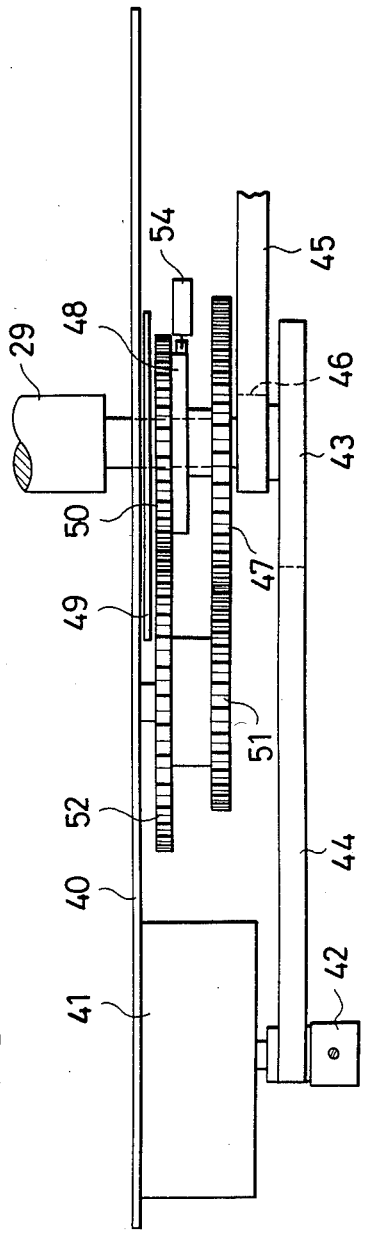

RECORDING PAPER FEEDING APPARATUS

BACKGROUND OF THE INVENTION

1. Field of the Invention

This invention relates to a recording paper feeding apparatus for feeding continuous recording paper, usually stored in the form of a roll, from a recording paper storing section to a desired section such as an image forming section in various recording machines such as facsimile machines, copiers and printers. More in particular, the present invention relates to a recording paper feeding apparatus capable of loading recording paper with ease and setting the recording paper in position securely. Moreover, the present invention relates to a paper feeding apparatus capable of transporting recording paper as fed along a predetermined travelling path smoothly as well as securely.

2. Description of the Prior Art

In recording machines, such as facsimile machines, which use a roll of recording paper, a roll of recording paper must first be placed in a recording paper storing section, and, then, the leading end of the recording paper must be manually moved along a relatively narrow travelling path, along which various components such as a recording head, paper cutter and transport rollers are disposed, so as to set the recording paper in position. In such a case, an operator is usually required to visually check whether the recording paper is properly set in position or not. However, such a visual observation tends to be untrustworthy mainly due to the fact that the structural constraints do not allow a sufficient visual observation.

Furthermore, in the case of using a roll of recording paper, it must be cut into a desired size after recording. And, thus, a paper cutter must be disposed in the downstream of a recording head as spaced apart therefrom. Such a positional relation between the paper cutter and the recording head would produce an intolerably large top margin if the next recording operation were to be carried out right after the cutting of the recording paper. In view of this, it has been proposed to pull the recording paper backward over a predetermined distance prior to the initiation of the next recording operation. However, such a pull-back operation will produce other disadvantages, especially when use is made of several kinds of recording paper differing in width size. Accordingly, there has been a need to further improve a recording paper feeding apparatus having the function of pulling back recording paper prior to the initiation of the next recording operation.

SUMMARY OF THE INVENTION

The disadvantages of the prior art are overcome with the present invention, and there is provided a novel apparatus for feeding recording paper in the form of a roll suitable for use in a recording apparatus such as a facsimile machine, copier and printer.

Therefore, it is a primary object of the present invention to provide an improved apparatus for feeding recording paper.

Another object of the present invention is to provide a recording paper feeding apparatus in which a roll of recording paper may be securely and easily loaded.

A further object of the present invention is to provide a recording paper feeding apparatus in which recording paper may be easily set in position for use.

A still further object of the present invention is to provide a recording paper feeding apparatus capable of feeding recording paper along a predetermined travelling path smoothly.

A still further object of the present invention is to provide a recording paper feeding apparatus capable of preventing the production of an unnecessarily large margin at top.

A still further object of the present invention is to provide a recording paper feeding apparatus which is suitable for use in a recording machine such as a facsimile machine, copier and printer.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic illustration showing the rear side view of a mechanism for driving the platen roller and cutter provided in the machine of FIG. 1;

FIG. 4 is a plan view of the mechanism shown in FIG. 3;

DESCRIPTION OF THE PREFERRED EMBODIMENTS

Although it will be described as to specific embodiments when the present invention is applied to a facsimile machine referring to the accompanying drawings in the following, it should be noted that the present invention should not be limited to such specific embodiments as will be described and the scope of the present invention should be determined on the basis of what is claimed and equivalents thereof.

Figure 1:
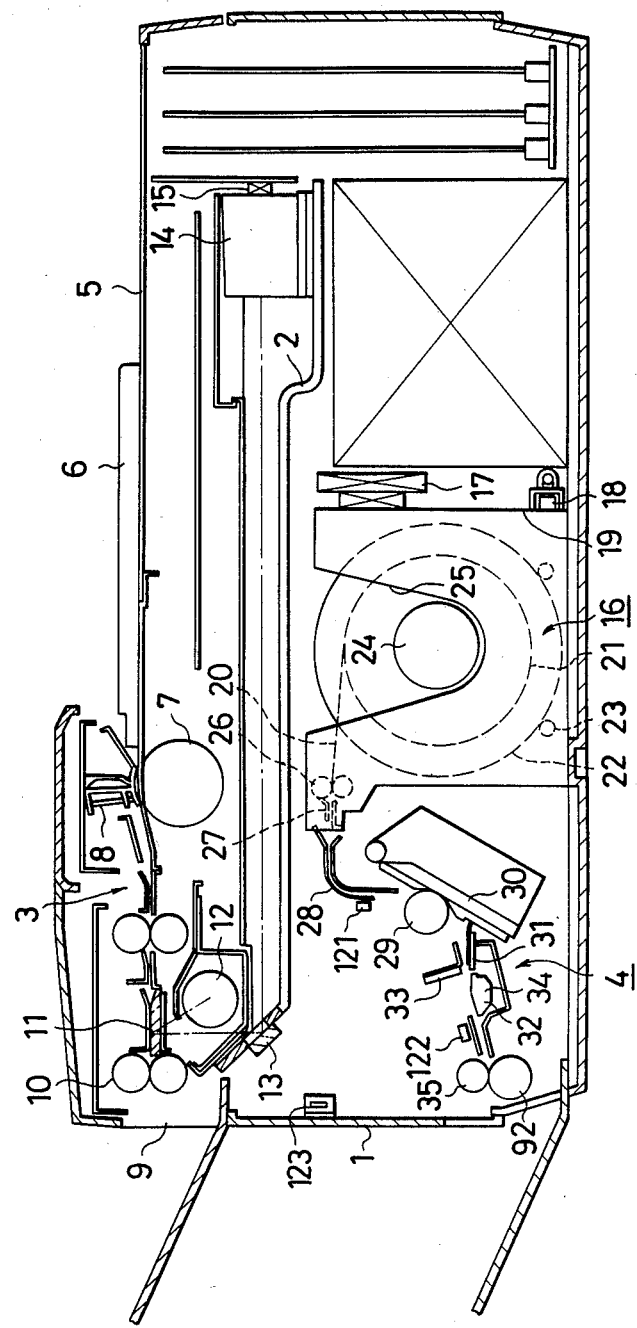
FIG. 1 is a longitudinal, cross-sectional view of a facsimile machine to which the present invention has been embodied.

As shown in FIG. 1, the facsimile machine to which the present invention is applied includes a machine housing 1 which is generally divided into upper and lower sections by a stay 2, which is also used as a base of a scanner, wherein a reading portion 3 for reading an original image to be transmitted is provided in the upper section and a recording portion 4 for recording received facsimile image on recording paper is provided in the lower section. A table 5 for placing thereon one or more original documents in the form of a stack is provided at top of the machine housing 1, and a guide plate 6 along which the original documents advance one by one with their sides in sliding contact is provided as erected on the table 5. An original document separator roller 7, which forms an original document separator mechanism together with such elements as a pressure plate, paper stopper, separating pressure separating pin and separator rubber, which are disposed above the roller 7, is provided at one end of the table 5. An original document discharging port 9 is defined at top left of the facsimile machine in FIG. 1, and original documents may be discharged through this port 9 one by one after reading. An original document transporting roller 10 is disposed adjacent to and in the downstream side of a contact glass plate 11, defining a window for reading an original image on a document to be transmitted. And, below the contact glass plate 11 is disposed an illumination lamp 12 for illuminating the surface of an original document being transported along the contact glass plate 11. Also disposed is a mirror 13 stationarily held as inclined to lead the light reflected from the original document on the contact glass plate 11 to a solid-state image scanning device 15 through a lens 14.

A roll paper storing section 16 is defined approximately at the center in the lower half section of the machine, and it includes a roll paper storing box 19 which stores therein a roll of recording paper and which rides on a slide rail 17 and an auxiliary rail 18 so as to be movable back and forth along these rails. In the roll paper storing box 19 is provided a pair of stays 23, 23 on which circular flange sections 22 of a roll paper holder 21 for holding long and continuous recording paper 20 as wound therearound in the form of a roll rests. It is to be noted that the recording paper 20 of differing sizes may be used, and roll paper holders 21 having rolls of differently width-sized recording paper may be selectively installed into the box 19. Moreover, the box 19 is formed with a V-shaped cut away section 25 flared outwardly upward, through which a knob 24 integral with the roll paper holder 21 projects to the front. The box 19 is also provided with a pick-up roller 26 and a manual paper cutter 27 at top left of the box 19 in FIG. 1.

With its entrance opposed to the manual paper cutter 27, a generally L-shaped paper guide 28 is provided to guide the advancement of the recording paper 20 after passing through the pick-up roller 26 and manual cutter 27. Below the paper guide 28 is disposed a platen roller 29, which also functions as a paper transport roller and which is in contact with a thermal print head 30 defining a recording head for recording received information on the recording paper 20. Thus, the recording paper 20 used is preferably of thermally sensitive paper which produces color upon application of heat thereto. On the other hand, the recording paper 20 may be of plain paper, and, in such a case, thermally sensitive ribbon paper should be preferably used as sandwiched between the recording paper 20 and the thermal print head 30. A paper guide plate 31 is disposed adjacent to the thermal print head 30 to guide the further advancement of the recording paper 20 after recording, and a paper cutter 32 is mounted on the guide plate 31. The cutter 32 includes a stationary blade 33 fixedly mounted on the guide plate 31 and a movable blade 34 which is movable with respect to the stationary blade 33 and thus the guide plate 31.

Figure 18:
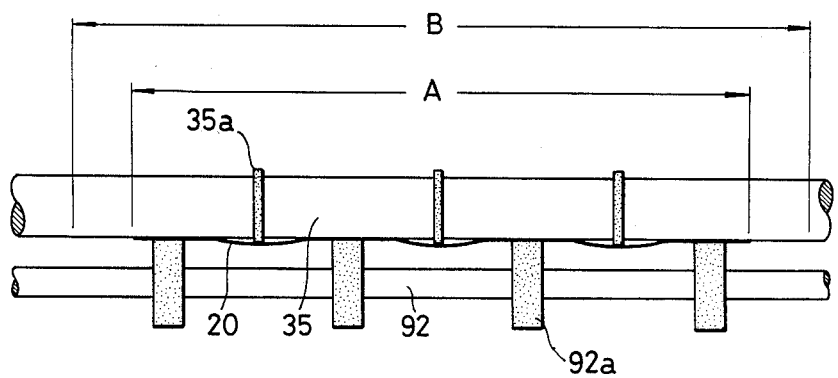
FIG. 18 is a schematic illustration showing the structure of the paper discharging roller constructed in accordance with one embodiment of the present invention.

In the downstream side of the cutter 32 is disposed a recording paper discharging roller 35, which is preferably comprised of a pair of rollers. In one embodiment, as shown in FIG. 18, the paper discharging roller 35 is comprised of a metal and an appropriate number of rubber rings 35a are provided as fitted onto the roller 35 as spaced apart from each other at a predetermined interval. Such a structure allows to impart a certain degree of rigidity to the recording paper 20 as locally bent as shown in FIG. 18. In parallel with the paper discharging roller 35 is disposed an idler roller 92, on which is fixedly mounted a plurality of rubber rollers 92a which are pressed against the roller 35. The recording paper 20 is held tightly between the paper discharging roller 35 and the rubber rollers 92a so that the recording paper 20 may be advanced when at least either one of the rollers 35 or 92a is driven to rotate. Of importance, the expance or scope of dispositon of the rubber rollers 92a along the roller 92 should be so selected that it is at least equal to or smaller than the width of recording paper 20 to be used. For example, if two width-sized recording paper, B4 and A4, is to be used selectively, the distance between the two outermost rubber rollers 92a must be smaller than the width of A4-sized recording paper, or the width of the smallest-sized recording paper used.

Also provided as shown in FIG. 1 is a pair of detectors 121 and 122 for detecting the presence and absence of the recording paper 20 at the position where the respective detectors are disposed along the recording paper travelling path defined in the housing 1. The first detector 121 is disposed in the upstream side of the platen roller 29 with respect to the direction of advancement of the recording paper 20; on the other hand, the second detector 122 is disposed in the downstream side of the cutter 32. Any conventional elements may be employed to construct the detectors 121 and 122, which may, for example, be mechanical or photoelectrical.

Although not shown specifically in FIG. 1, it is to be noted that a front door is pivotally provided at the front side of the housing 1 such that the front door may be manually pivoted to be open or closed. Also provided as fixedly mounted on the housing 1 is an external switch 123, as shown in FIG. 1, which may be automatically turned on and off as the front door is closed and opened.

Figure 16:
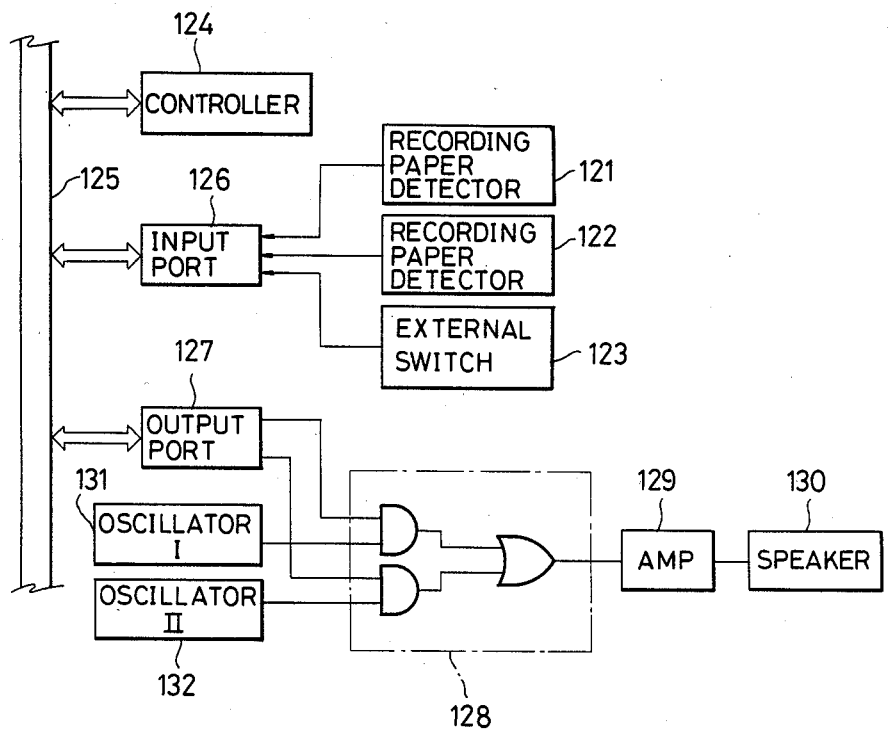
FIG. 16 is a block diagram showing the structure of one embodiment of the present invention for securing proper loading of recording paper.

The facsimile machine of FIG. 1 is provided with a control system having the structure shown in Fig. 16. As shown, the control system of FIG. 16 includes a controller 124 which may, for example, be comprised of a central processing unit or the like, an input port 126 and an output port 127, which are all interconnected by a bus line 125. The input port 126 is connected to the first recording paper detector 121, the second recording paper detector 122 and the external switch 123. Provided as connected to the output port 127 is a gate circuit 128, whose output is connected to a speaker 130 via an amplifier 129. The gate circuit 128 has its one input connected to an oscillator I 131, which determines the frequency of a signal sound to be produced at the speaker 130, and its another input connected to another oscillator II 132, which determines the frequency of an alarm sound to be produced at the speaker 130. The operation of the system shown in FIG. 16 will be described in detail later.

Referring now to FIGS. 2 through 8, it will be described as to the travelling path for the recording paper 20 defined in the housing 1 of the facsimile machine shown in FIG. 1. The paper guide 28 having its entrance located opposite to the manual cutter 27 includes an upper guide plate 36 and a lower guide plate 37, both of which are bent in the direction in compliance with the curling direction of the recording paper 20 as unwound from the paper roll to define a curved travelling path therebetween. The lower guide plate 37 extends in the downward direction to the vicinity of an entrance 38 of the nip defined between the platen roller 29 and the thermal print head 30; on the other hand, the upper guide plate 36 also extends in the downward direction, but it terminates short of the lower guide plate 37, thereby forming an opening 39 between the entrance 38 and the bottom end of the upper guide plate 28.

FIG. 3 is a rear side view showing a part of the machine illustrated in FIG. 1, and FIG. 4 is a plan view showing the structure of FIG. 3. As shown, there is provided a motor 41, comprised, for example, of a stepping motor, as fixedly mounted on a rear plate 40 which forms a part of the housing 1. The motor 41 has a driving pulley 42 which is coupled to a platen pulley 43 via a power transmitting endless belt 44. The platen pulley 43 is provided integrally with the platen roller 29, and a paper discharging pulley 46, around which is passed a paper discharging power transmitting belt 45, is also provided integrally with the platen roller 29. The platen roller 29 is provided with a platen gear 47 via a one-way clutch so that driving power may be transmitted to a driven element only when the platen roller 29 rotates in the clockwise direction. Also provided with the platen roller 29 via a one-way clutch is a cutter gear 50 which includes a switch plate 48 and a cutter cam 49 as a unit. Idler gears 51 and 52 are provided to be meshed with the platen gear 47 and cutter gear 50, respectively, and it is so structured that the cutter gear 50 increases its rotational speed in association with the rotational speed of the platen roller 29. A dent 53 is formed at a point along the periphery of the switch plate 48, and an actuator of a cutter position switch 54 may come into engagement with the dent 53.

A cutter bracket 57 is fixedly mounted on a pivot pin 55 as biased in the clockwise direction by means of a tension spring 56, and a cutter cam follower 58 is fixedly mounted on the cutter bracket 57 to be in sliding contact with a cutter cam 49 having its outer periphery formed in a spiral shape. The movable blade 34 is also fixedly mounted on the pivot pin 55. The cutter bracket 57 has a projection 59 which may be brought into contact against a cutter stopper 60 thereby to define a maximum rotating angle of the bracket 57.

Figure 5:
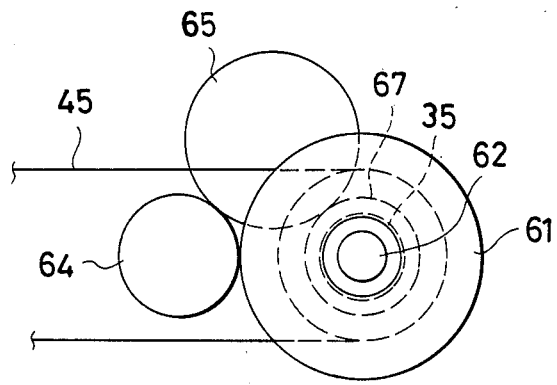
FIG. 5 is a schematic illustration showing the rear side view of a mechanism for driving the paper discharging roller provided in the machine of FIG. 1.
Figure 6:
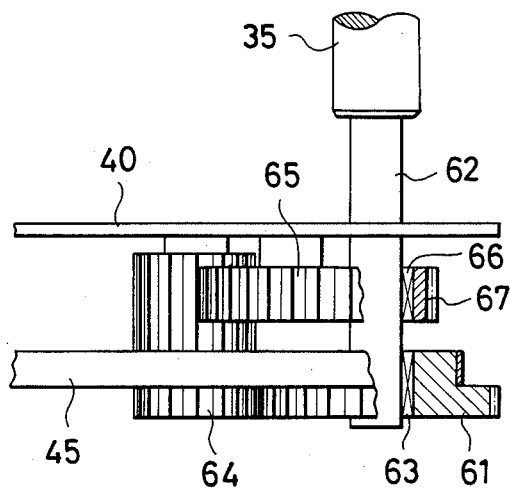
FIG. 6 is a partially cut-away, plan view of the mechanism shown in FIG. 5.

FIG. 5 schematically illustrates the driving system for driving to rotate the paper discharging roller 35 provided in the machine of FIG. 1 and viewed from its rear side similarly with the case of FIG. 3. The paper discharging power transmitting belt 45 passes around a gear 61, which is mounted through a one-way clutch 63 on a shaft 62 of the paper discharging roller 35. Thus, when the gear 61 rotates in the clockwise direction, no driving power is transmitted to the shaft 62; whereas, when the gear 61 rotates in the counterclockwise direction, driving power is transmitted to the shaft 62. The gear 61 is in mesh with an idler gear 65 which, in turn, is in mesh with a gear 67 which is mounted through a one-way clutch 66 on the shaft 62. Clockwise rotation of the gear 67 transmits no power to the shaft 62, but power is transmitted to the shaft 62 when the gear 67 rotates in the counterclockwise direction.

As regards the movement of the recording paper 20 when the facsimile machine is in operation, recording is carried out as the recording paper 20 is being moved in the forward direction as driven by the rotation of the platen roller 29, and upon completion of recording for a single page, the cutter 32 is activated to sever the recording paper 20. Thereafter, in order to limit the top margin of the next page, the recording paper 20 is pulled backward over a desired distance to locate the printing position of the thermal print head at an appropriate position on the next page; at the same time, that portion of the recording paper 20 severed by the cutter 32 is moved further forward to be discharged out of the machine by means of the paper discharging roller 35. This operation will be described in detail with reference to FIGS. 3 through 8; however, it should be noted that the direction of rotation is reversed as compared with the case of FIG. 2 because these figures are rear views.

Figure 7:
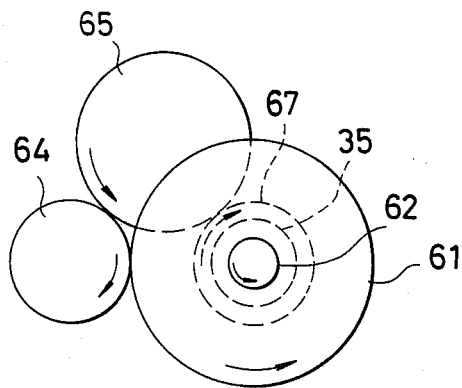
FIGS. 7 and 8 are schematic illustrations showing the power transmitting conditions between the elements shown in FIG. 5.
Figure 8:
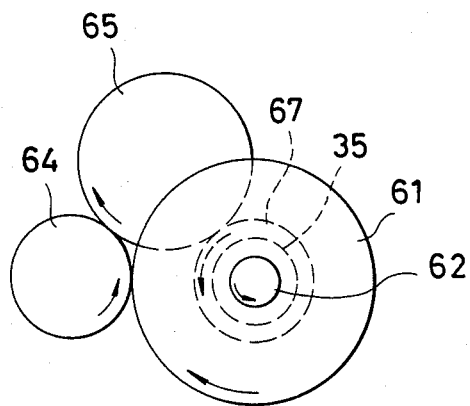

When the platen pulley 43 is driven to rotate in the counterclockwise direction by means of the motor 41, which is preferably driven in a two-phase excitation mode, the platen gear 47 is not set in rotation, and the platen roller 29 rotates in the counterclockwise direction to have the recording paper 20 transported in the forward direction. At the same time, the gear 61 is driven to rotate in the counterclockwise direction through the belt 45, so that the paper discharging roller 35 rotates in the counterclockwise direction to cause the recording paper to be advanced. This situation is shown in FIG. 7, and, as shown, the gear 67 rotates in the clockwise direction in association with the idler gears 64 and 65; however, the rotation of the gear 67 is not associated with the rotation of the shaft 62 due to the existence of the one-way clutch therebetween. On the other hand, when the motor 41 is set in the reversed rotation, the platen roller 29 is driven to rotate in the reversed direction thereby setting the recording paper 20 in tension, and, at the same time, the cutter cam follower 58 becomes disengaged from the cutter cam 49 thereby allowing the cutter bracket 57 to rotate under the force of the tension spring 56 until the projection 59 comes into contact against the stopper 60. Thus, the movable blade 34 is moved with respect to the stationary blade to have the recording paper 20 severed.

As regards the driving condition of the motor 41, in one embodiment of the present invention, it is so structured that the motor 41 starts to be driven in a 1-2 phase excitation mode simultaneously with the application of a reversed rotation command for a duration which corresponds to several hundred pulses, and, thereafter, the motor 41 becomes driven in a 2 phase excitation mode. As compared with the 2 phase excitation mode driving, the 1-2 phase excitation mode driving is slower in speed by ½ but larger in torque produced, so that a sufficient driving force may be obtained in correspondence with a large load required at the time of initiation of reversed rotation even if the motor 41 has a relatively smaller capacity. Thus, such a structure is advantageous because use may be made of a smaller capacity pulse motor for the motor 41.

As described previously, the structure shown in FIG. 18 may be advantageously adopted as one embodiment of the present invention. The operation of this case will be briefly described hereinbelow. When the movable blade 34 is moved to sever the recording paper 20, the platen roller 29 is in reversed rotation, so that the paper discharging roller 35 is in forward rotation. However, the recording paper 20 does not advance with a slippage present between the recording paper 20 and the roller 35, and, therefore, the idler roller 92 which rotates in accordance with the movement of the recording paper 20 stays still without rotation. Moreover, since the rubber rollers 92a, which cause the recording paper 20 to move, are always in contact with the recording paper 20, there is no possibility of increasing the load of the paper discharging roller 35. Stated differently, since the rubber rollers 92a are so arranged to expanse a predetermined distance along the roller 92 not exceeding the minimum width of recording paper used, there is no possibility for any of the rubber rollers 92a coming into contact with the paper discharging roller 35 to increase the load against the roller 35.

Returning to the description as to the severing operation of the movable blade 34, the motor 41 continues to rotate in the reversed direction until the length of leading section of the thus severed recording paper 20 becomes a desired value or the printing position of the thermal print head 30 is located at a position of the recording paper 20 where printing is desired. Under the condition, the gear 61 is driven to rotate in the clockwise direction, but no driving power is transmitted to the shaft 62 due to the presence of one-way clutch 63. However, the gear 67 is driven to rotate counterclockwise via the idler gears 64 and 65 so that the roller 35 is driven to rotate counterclockwise. Accordingly, the cut-away portion of the recording paper 20, on which recording has been completed, is discharged out of the machine.

Figure 2:
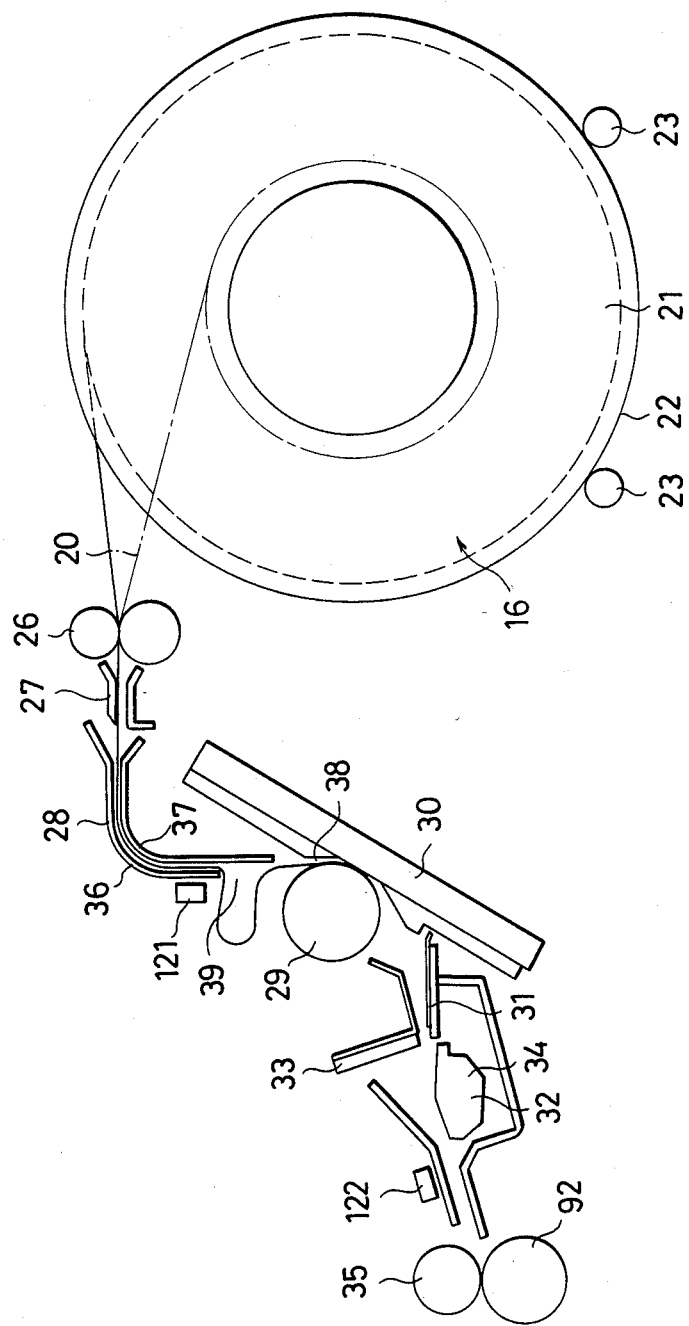
FIG. 2 is a schematic illustration showing on an enlarged scale a portion of the recording paper travelling path defined in the machine of FIG. 1.

Referring back to FIG. 2, the pull-back operation of recording paper 20 after severing will now be described. Normally, when the platen roller 29 is driven to rotate in the reversed direction, the recording paper 20 is moved backward along the guide 28 so that the roller 26 is caused to rotate in the reversed direction due to this backward movement of the recording paper 20. As a result, a slackened portion of the recording paper 20 is produced in the roll paper storing section 16. However, in the case where the recording paper 20 has a relatively low stiffness, or the load of the roller 26 is relatively large, or the load or frictional force of the guide 28 is relatively large, a slackened portion of the recording paper 20 is formed at the opening 39, as shown in FIG. 2. Since the manner of forming a slackened portion in the opening 39 is in compliance with the tendency of the recording paper 20 to curl, such a slackened portion may be easily formed without constraint thereby allowing to prevent the recording paper 20 from being jammed even if it is pushed backward. Moreover, since the location where the slackened portion is formed is in the neighborhood of the platen roller 29 which imparts a driving force to the recording paper 20, a smooth operation may be expected when the recording paper 20 is again moved forward. Besides, at the time of paper setting, when the leading edge of the recording paper 20 is lead into the travelling path defined between the upper and lower guide plates 36, 37, the leading edge of the recording paper 20 tends to keep contact with the lower guide plate 37 so that the presence of the opening 39 does not present any problem and the leading edge may be securely lead into the entrance 38.

Now, various components disposed along the paper travelling path and their operation will be described with reference to FIGS. 9 and 10. As shown, between the rear plate 40 and the front plate 68 extends a detector plate supporting shaft 69 provided as rotatable around its longitudinal axis. The shaft 69 is disposed at top right of the roll paper storing section 16 and a recording paper remaining amount detecting plate 70, whose free end may ride on the outermost peripheral surface of the recording paper 20 wound around the roll paper holder 21, is fixedly attached to a middle section of the shaft 69. At the front end of the shaft 69 extending beyond the front plate 68 is fixedly attached a generally V-shaped reset lever 71. An operating knob 72 is mounted at the forward end of reset lever 71. A cam 73 is fixedly attached to the other end of the shaft 69, and a paper remaining amount detection switch 74 is disposed such that it may be turned on and off as actuated by the cam 73.

Figure 9:
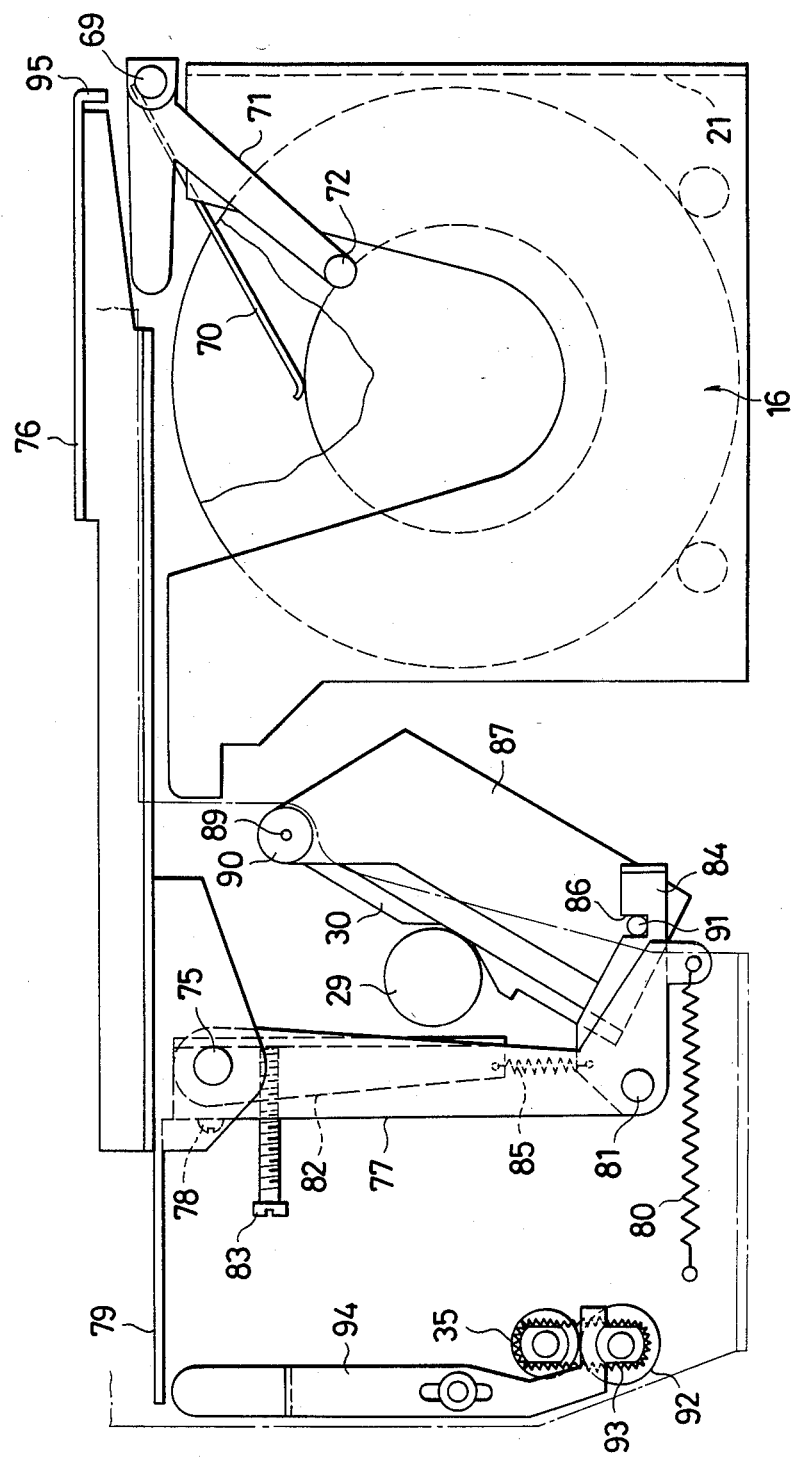
FIG. 9 is a front view of the facsimile machine of FIG. 1 with its front plate removed to schematically show the arrangement of various components provided in the machine.
Figure 10:
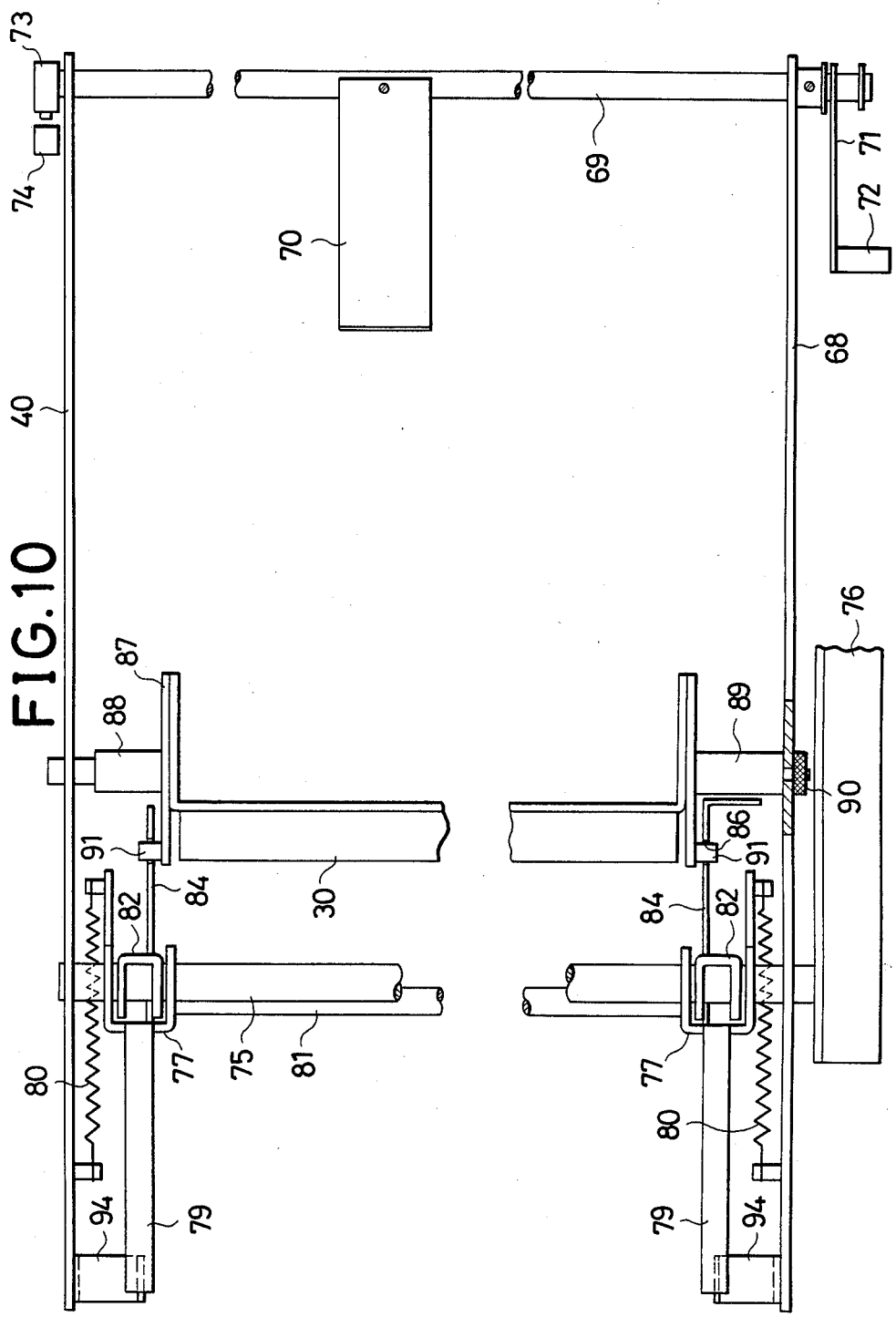
FIG. 10 is a plan view of the structure shown in FIG. 9.
Figure 11:
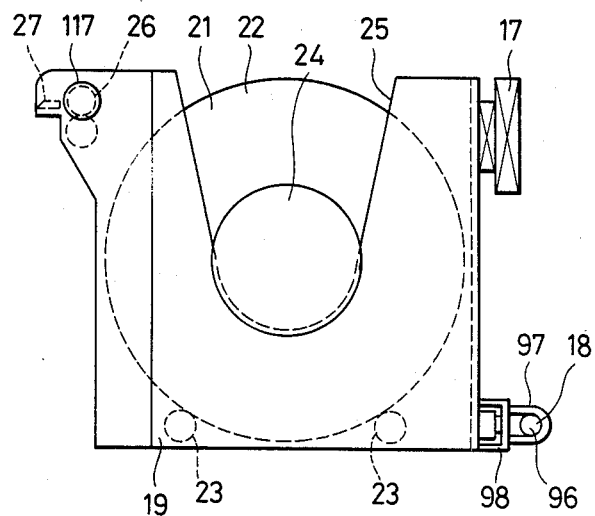
FIG. 11 is a front view schematically showing the roll paper storing section of the machine shown in FIG. 1.

At top left, as shown in FIG. 9, is disposed a press arm supporting shaft 75 extending between the front plate 40 and the rear plate 68. At the front end of the press arm supporting shaft 75 is fixedly attached a head reset arm 76 which extends horizontally to a point above the reset lever 71. A pair of press arms 77, 77 is fixedly mounted on both ends of the press arm supporting shaft 75 by means of a screw 78. Each of the press arms 77, 77 has a pressure lever 79 formed integrally at top and extending horizontally in parallel with the front and rear plates 40 and 68, and it has its bottom end connected to one end of a tension spring 80 to be biased in the clockwise direction. A head hanger supporting shaft 81 is provided at the bottom portion of the press arm 77. Further, a relay arm 82 is fixedly mounted on the press arm supporting shaft 75 such that its angular position may be adjusted by an adjusting screw 83. In addition, a head hanger 84 is pivotally mounted on the head hanger supporting shaft 81, and a tension spring 85 is extended between the relay arm 82 and the head hanger 84 so that the head hanger 84 is normally biased in the counterclockwise direction. The head hanger 84 is provided with an engaging recess 86 which is open at top.

A head bracket 87 is provided to support the thermal print head 30, and a pair of head supporting pins 88 and 89 are fixed on both ends of the head bracket 87. The head supporting pin 88 at the rear side is loosely fitted into a hole provided in the rear plate 40 such that it may move longitudinally; on the other hand, the head supporting pin 89 at the front side has a small-radius section which is fitted into a hole provided in the rear plate 68 and a nut 90 is threaded onto the small-radius section such that the pin 89 does not move along its longitudinal direction but it is free to rotate around its longitudinal axis. On both ends of the head bracket 87 are formed arm hangers 91, 91 at bottom as projecting outwardly from the both end surfaces of the head bracket 87. These arm hangers 91, 91 are normally in engagement with the respective engaging recesses 86, 86. When engaged, the thermal print head 30 is set in postion as pressed against the platen roller 29 with the recording paper 20 inbetween; however, when disengaged, the thermal print head 30 swings away from the platen roller 29 by its own weight.

Below the paper discharging roller 35 is disposed an idler roller 92 such that it is normally pressed against the paper discharging roller 35 by means of a ring spring 93 but it may move closer to and separate away from the paper discharging roller 35. There is also provided a paper discharging roller reset lever 94 which is vertically movable, and the bottom end of this lever 94 is in abutment against the shaft of the idler roller 92. In addition, the top end of this lever 94 is positioned below the forward end of the pressure lever 79.

The condition illustrated in FIG. 9 is a normal set condition for operation, and the reset lever 71 takes the position as determined by the contact between the recording paper remaining amount detector plate 70 and the recording paper 20. Under the condition, the roll paper storing box 19 cannot be pulled out, whereby the reset lever 71 functions as a security means. When the remaining amount of the recording paper 20 has reached a predetermined level, indicating the predetermined rotation of the detector plate supporting shaft 69, the cam 73 comes into engagement with the remaining amount detector switch 74 to cause it to be turned on so that a signal indicating the necessity for loading a new roll of recording paper 20 is generated.

In the case of loading a new roll of recording paper 20, an operator must hold the operating knob 72 to have the reset lever 71 pivoted around the shaft 69 in the clockwise direction, so that the forward end of horizontal part of the V-shaped reset lever 71 comes into contact with the head reset arm 76 until the forward end comes into engagement with a stopper member 95 formed as bent at the end of the head reset arm 76, whereby the head reset arm 76 is lifted as pivoted around the shaft 75. Such a pivotal movement of the reset lever 71 causes the recording paper remaining amount detector plate 70 to move upward and away from the roll paper holder 21. And, since the reset lever 71 is moved away from the front of the roll paper holder 21, the holder 21 may now be pulled out. Moreover, the pivotal motion of the head reset arm 76 causes the press arm 77 to pivot counterclockwise through the press arm supporting shaft 75. Thus, the head hanger 84 supported by the head hanger supporting shaft 81 pushes the arm hanger 91 so that the head bracket 87 is pivoted counterclockwise. Accordingly, the thermal print head 30 moves away from the platen roller 29 thereby allowing easy passage of the recording paper 20 therebetween. Moreover, since the press arm 77 pivots counterclockwise, the pressure lever 79 pushes the lever 94 downward. As as result, the idler roller 92 shifts in the downward direction to be separated away from the paper discharging roller 35 thereby allowing free passage of the recording paper 20 therebetween without constraint.

With the structure described above, it is to be noted that a simple pivotal motion of the reset lever 71 in the counterclockwise direction can produce four effects: (1) establishing the condition to allow to pull out the roll paper holder 21; (2) resetting the recording paper remaining amount detector plate; (3) separating the thermal print head 30 from the platen roller 29; and (4) releasing the restraint of the recording paper 20 at the paper discharging roller 35. Therefore, with such a structure, the recording paper 20 remaining in the holder 21 may be easily removed, and the pulling out of the holder 21 and loading of a new roll of recording paper may be carried out with ease.

When the reset lever 71 is returned to its original position, the recording paper remaining amount detector plate 70 swings by its own weight to come into contact with the outer peripheral surface of roll of recording paper 20. At the same time, the thermal print head 30 also swings back to its original position due to the force of the tension spring 80; further, the idler roller 92 also returns to its original position to be pressed against the paper discharging roller 35 due to the force of the ring spring 93.

For the purpose of maintenance, it is often desired to have the thermal print head 30 dismounted. In this case, the forward end of head hanger 84 must be pushed downward. When so pushed, the head hanger 84 pivots against the force of the tension spring 85 and it is disengaged from the arm hanger 91. When disengaged, the head bracket 91 enters into the state of freely hanging from the head supporting pins 88 and 89. Then, after removing the nut 90, when the head bracket 87 is moved toward the rear plate 40, the head supporting pin 89 at the front side is disengaged from the front plate 68. Then, by moving the head bracket 87 generally in the front direction such that the head supporting pin 89 does not interfere with the front plate 68 until the other head supporting pin 88 is disengaged from the hole in the rear plate 40, the thermal print head 30 as mounted on the head bracket 87 may be dismounted. With the thermal print head 30 removed in this manner, there is created a relatively large central space, thereby allowing easy access to various components within the housing 1 for the purpose of maintenance or the like. Besides, replacement of the thermal print head 30 itself may be easily carried out.

The thermal print head 30 may be mounted into the machine by following the above-described steps in the reversed order. In this case, if the thermal print head 30 is integrally provided on the head bracket 87 with accurate alignment, the thermal print head 30 may be easily and securely set in position just by mounting the head bracket 87 as set forth above.

Referring now to FIGS. 11 through 15, the structure and operation of the roll paper storing box 19 will now be described. The slide rail 17 mounted on one side of the box 19 is slidably movable along its longitudinal direction and it may be removed when pulled in the front direction extremely. The auxiliary rail 18 mounted on the box 19 below the slide rail 17 includes a guide rod 96 extending between the front and rear plates 40, 68. A pair of brackets 97, 97 spaced apart from each other over a predetermined distance is slidably fitted onto the guide rod 96, and these brackets 97, 97 are fixedly attached to an intermediate guide 98, which has a channel-shaped cross section and a length substantially equal to that of the roll paper storing box 19. A pair of projections 99 and 100 is formed at the front end and at the middle of the intermediate guide 98.

The roll paper storing box 19 is also provided with another projection 101 which is engageable with the projection 100 of the intermediate guide 98. Also provided is an engaging lever 102 which may pivot around a pin 103. The engaging lever 102 is integrally formed not only with a tab 104, but also with a tongue 104 which is opposite to the projection 99. It is to be noted that a relief notch ( not shown ) is formed in the intermediate guide 98 such that the tongue 105 may pivot to be disengaged from the projection 99 when the tongue 105 is in engagement with the projection 99.

In the roll paper holder 21 is provided a bearing member 107 which is spring-biased outwardly by means of a compression spring 106 and which is pressed against a cone-shaped portion 109 of a gear 108 rotatably mounted on the rear plate 40. The gear 108 in turn is in mesh with a gear portion 111 of a cam member 110 which is also rotatably mounted on the rear plate 40. In the periphery of the cam member 110 is formed a pair of projections 114, 114 engageable with a pair of stopper pins 112, 113, respectively, and an arc-shaped notch 115 having a predetermined arc length. On the rear end surface of the roll paper holder 21 is fixedly mounted a lock plate 116 which is engageable with the cam member 110.

Figure 12:
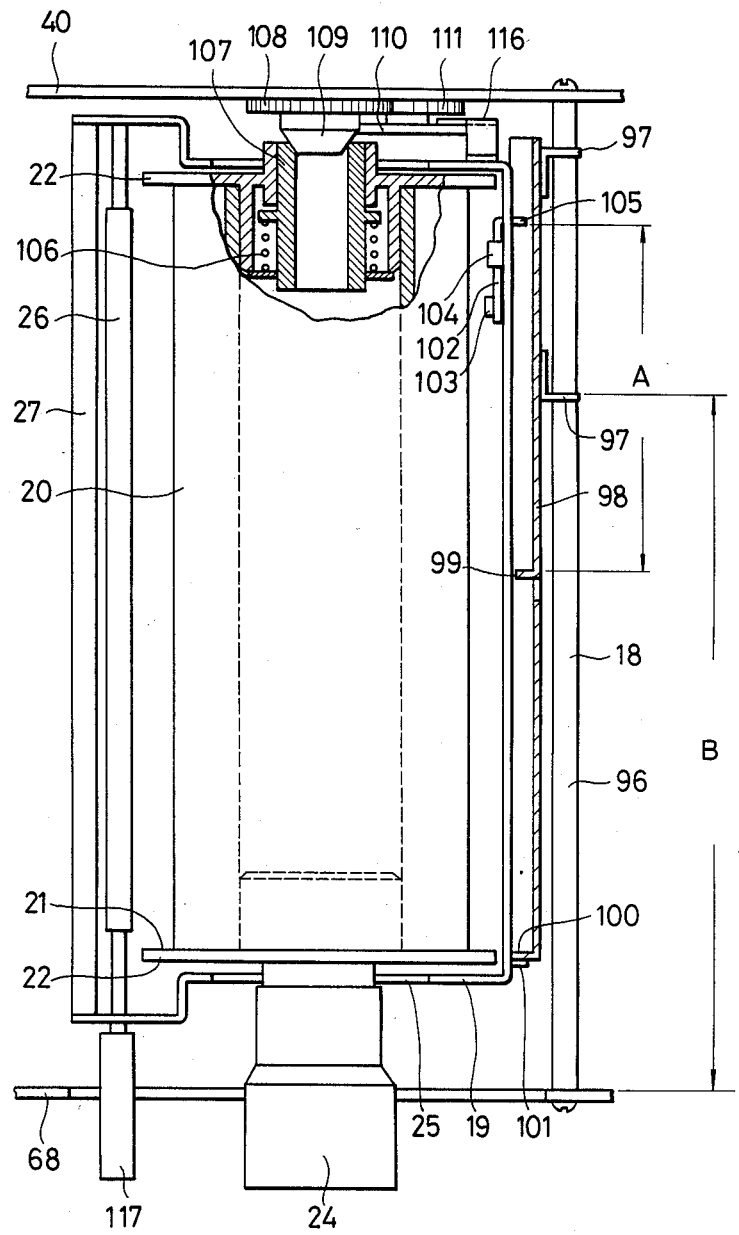
FIG. 12 is a partially cut-away, plan view of the structure shown in FIG. 11.
Figure 13:
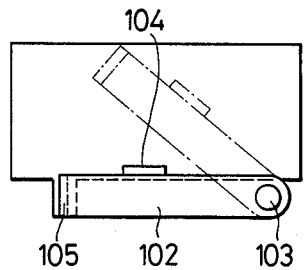
FIG. 13 is a schematic illustration useful for explaining the operation of the engaging lever provided in the roll paper storing section shown in FIG. 12.
Figure 14:
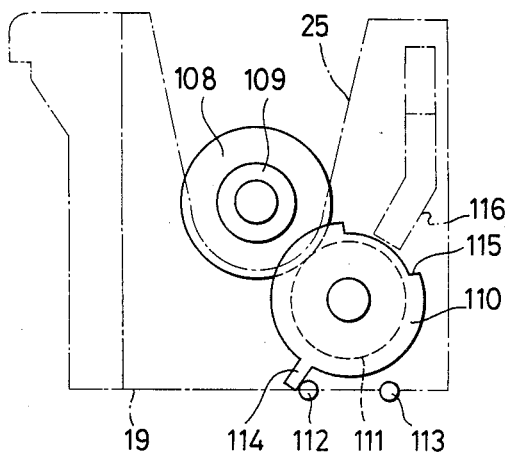
FIG. 14 is a schematic illustration showing the rear side view of the roll paper storing section shown in FIG. 12.
Figure 15:
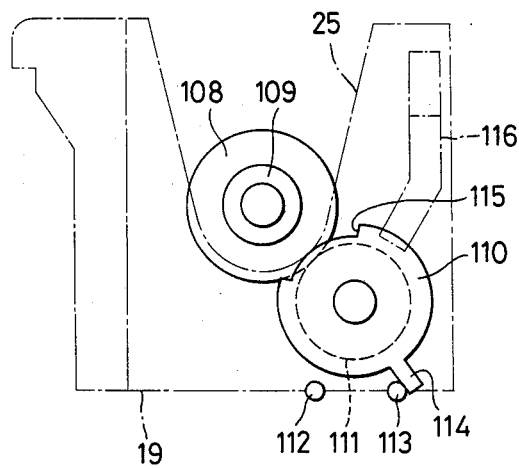
FIG. 15 is a schematic illustration showing the same view as that of FIG. 14, but indicating the state in which the roll paper storing box is locked in position.

It will now be explained the operation for mounting and dismounting the roll paper storing box 19. First, a dismounting operation will be described. Figs. 12 and 15 illustrate a condition in which the box 19 is mounted in position. An operator first grab the knob 24 to cause the roll paper holder 21 to rotate clockwise thereby having the recording paper 20 with its leading edge extending to the thermal print head 30 completely rewound to form a roll. At the same time, the gear 108 rotates clockwise, which then causes the cam member 110 to rotate couterclockwise until the projection 114 comes into contact with the stopper pin 112. As a result, as shown in FIG. 14, the arc-shaped notch 115 becomes aligned in position with the lock plate 116. For this reason, a lock in the direction of pulling out the roll paper storing box 19 is released, so that if the operator pulls the knob by grabbing it by his or her hand 24 under the condition, the box 19 is pulled out as sliding on the slide rail 17. The amount of movement of the box 19 in this case is a sum of a relative moving distance between the roll paper storing box 19 and the intermediate guide 98, which corresponds to a distance A between the tongue 105 and the projection 99, and a relative moving distance between the intermediate guide 98 and the guide rod 96, which corresponds to a distance B between the inwardly located bracket 97 and the front plate 68, as clearly indicated in FIG. 12.

With the above-described structure, the roll paper storing box 19 may move out of the housing 1 sufficiently beyond the front plate 68 in its entirety. Under the circumstances, when the tab 104 is pushed upward to cause clockwise rotation of the engaging lever 102, the tongue 105 is disengaged from the projections 99, 100, and, therefore, the roll paper storing box 19 may now be completely pulled out in the front direction. Such a pulling out operation is a special case such as maintenance. In this case, a void space is created in the roll paper storing section 16, and, thus, an operation for dismounting the thermal print head 30 may be carried out with ease.

With the roll paper storing box 19 pulled out as described above, the roll paper holder 21 with remaining recording paper 20 may be removed from the box 19 as lifted upwardly, and then the roll paper holder with a new roll of recording paper 20 may be placed into the box 19. The operator then grabs the knob 24 to push the box 19 toward the rear plate 40 until the bearing member 107 comes into pressure contact with the cone-shaped portion 109 of the gear 108. Then the roll paper holder 21 is caused to rotate counterclockwise, which, in turn, causes the gear 108 to rotate in the counterclockwise direction and the cam member 110 to rotate in the clockwise direction, thereby establishing the condition shown in FIG. 15. Under the condition, the cam member 110 is positioned such that it interferes with the lock plate 116, and, thus, the movement of the roll paper storing box 19 becomes restrained. Under the condition, a pick-up roller knob 117 is operated to feed the recording paper 20; however, the condition shown in FIG. 15 is maintained because slippage is produced between the bearing member 107 and the gear 108.

Since the center of gravity of the cam member 110 is located as deviated from its rotating center, even if it is set in an unrestrained state with the position shown in FIG. 14, it maintains its position by its own weight. Accordingly, when the roll paper storing box 19 is to be mounted, the lock plate 116 may securely pass through the arc-shaped notch 115 without interference. The recording paper 20 thus installed into the roll paper storing box 19 is unwound and advanced along the travelling path as fed by the pick-up roller 26, and the leading section may be severed out by the manual cutter 27 to provide a nice and straight leading edge. With the roll paper storing box 19 set in position, the pick-up roller knob 117 may be operated to manually feed the recording paper 20. In this case, since the reset lever 71 is in the advanced position, the thermal print head 30 is located away from the platen roller 29 and the idler roller 92 is also located away from the paper discharging roller 35.

Figure 17:
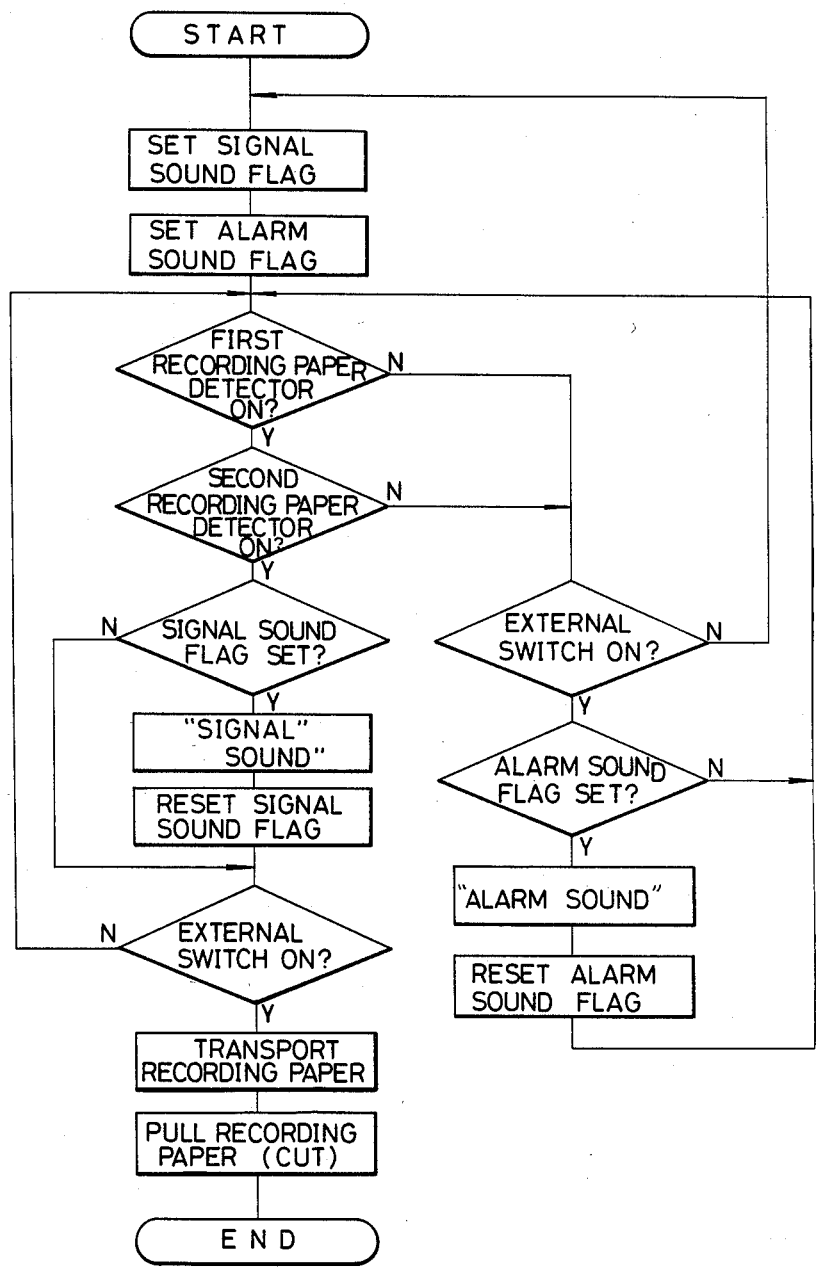
FIG. 17 is a flow chart useful for explaining the operation of the structure shown in FIG. 16.

Referring now, in particular, to FIGS. 16 and 17, in the first place, a signal sound flag and an alarm sound flag in the controller 124 are set. Then a test is carried out to determine whether the first and second recording paper detectors 121 and 122 are turned on. If both of them are turned on, which indicates that the leading edge of the recording paper 20 has moved past the cutter 32, signal sound having the frequency of the oscillator I 131 is produced, and the signal sound flag is reset. The production of signal sound is terminated momentarily. Then, after moving the reset lever 71 to its original position by having it pivoted in the counterclockwise direction, when the front door is closed to have the external switch 123 turned on, the platen roller 29 is first driven to rotate to move the recording paper 20 in the forward direction over a first predetermined distance and the cutter 32 is actuated to sever the recording paper 20, followed by the step of pulling the recording paper 20 back in the backward direction over a second predetermined distance, thereby terminating a loading operation of the recording paper 20. If the front door is closed to have the external switch 123 turned on under the condition that at least either one of the first and second recording paper detectors 121 and 122 is not turned on, then alarm sound having the frequency determined by the oscillator II 132 is produced for a predetermined time period because the alarm sound flag is set in this case, thereby indicating that the recording paper 20 is not loaded. Thereafter, the alarm sound flag is reset.

Figure 19:
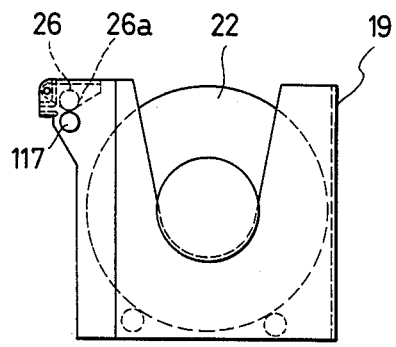
FIG. 19 is a front view showing the structure of the roll paper storing section constructed in accordance with another embodiment of the present invention.
Figure 20:
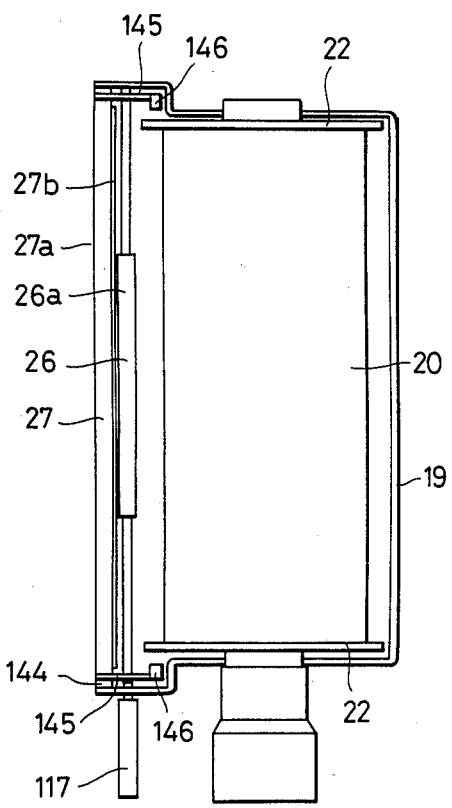
FIG. 20 is a plan view of the structure shown in FIG. 19.
Figure 21:
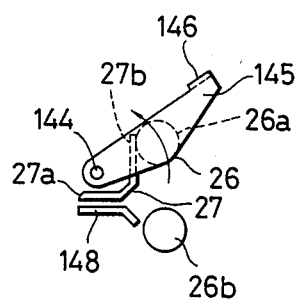
FIG. 21 is a schematic illustration showing on an enlarged scale the main elements of the structure shown in FIGS. 19 and 20.

Referring now to FIGS. 19 through 21, a further embodiment of the present invention will be described. In this embodiment, the transport roller 26 is comprised of a magnetic rubber roller 26a and a metal roller 26b, and the knob 117 is provided on the shaft of the metal roller 26b. The magnetic rubber roller 26a is supported by a bracket 145 which is pivotal around a pin 144, so that the magnetic rubber roller 26a may be brought into contact with or separated away from the metal roller 26b. At top of the bracket 145 is formed a holding section 146. Between the transport roller 26 and the guide plates 5, 6 is disposed a metal guide plate 27, whose forward end is formed into the manual cutter 27a and backward end is formed into a supporting section 27b extending upwardly to the vicinity of the magnetic rubber roller 26a.

With the above-described structure, when the knob 117 is manually operated to rotate the transport roller 26, the recording paper 20 is transported to the recording section. In the present embodiment, the recording paper 20 is transported as held under pressure between the two rollers 26a and 26b because of magnetic attractive force acting therebetween. When a new roll of recording paper 20 has been installed into the box 19, its leading edge must be passed between the two rollers 26a and 26b. In this case, in the present embodiment, the operator is only required to grab the holding section 14b to pivot the bracket 145 counterclockwise as indicated by the arrow in FIG. 21 to cause the roller 26a separated away from the roller 26b. The magnetic rubber roller 26a may be easily separated away from the metal roller 26b as the magnetic attraction reduces rapidly as they are brought further apart. And, as the magnetic rubber roller 26a is brought closer to the supporting section 27b of the metal guide plate 27, it now receives magnetic attractive force from the supporting section 27b and it remains attracted thereto. Under the condition, the leading edge of the recording paper 20 may be easily passed through the gap between the two rollers 26a and 26b. Thereafter, the operator again grab the holding section 14b to return the bracket 145 to its original position.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. Apparatus for indicating a loading condition of recording paper to be transported along a predetermined travelling path along which is disposed means for recording said recording paper and means for cutting said recording paper in the downstream of said means for recording with respect to the advancing direction of said recording paper along said path, said apparatus comprising:

first detecting means disposed at a first position in the upstream of said means for recording with respect to the advancing direction of said recording paper for detecting presence and absence of said recording paper at said first position;

second detecting means disposed at a second position in the downstream of said means for cutting with respect to the advancing direction of said recording paper for detecting presence and absence of said recording paper at said second position;

means for generating a first signal when both of said first and second detecting means have detected presence of said recording paper at said first and second positions, respectively; and means for moving said recording paper along said travelling path.

2. Apparatus of claim 1 further comprising means responsive to said first signal to produce first sound having a first predetermined frequency.

3. Apparatus of claim 1 further comprising means for storing said recording paper in the form of a roll, said recording paper moving along said travelling path as unwound from said roll.

4. Apparatus of claim 3 wherein said means for recording includes a recording head which defines a part of said travelling path.

5. Apparatus of claim 4 wherein said recording head is a thermal recording head and said recording paper is heat-sensitive paper.

6. Apparatus of claim 4 wherein said means for moving includes a platen roller against which said recording head may be pressed with said recording paper sandwiched therebetween.

7. Apparatus of claim 6 wherein said means for moving includes a reversibly rotatable motor for driving said platen roller to rotate in a desired direction.

8. Apparatus of claim 6 further comprising a pair of upper and lower guide plates spaced apart from each other over a predetermined distance to define a part of said travelling path and disposed between said means for storing and said means for recording.

9. Apparatus of claim 8 wherein said pair of guide plates are curved in compliance with the tendency of said recording paper to curl as unwound from said roll in said means for storing.

10. Apparatus of claim 9 wherein said lower guide plate has its bottom end located in the vicinity of the contact between said recording head and said platen roller and said upper guide plate has its bottom end terminating short of the bottom end of said lower guide plate, thereby defining an opening.

11. Apparatus of claim 1 further comprising:
a switch; and
means responsive to said first signal and also to the actuation of said switch for setting said recording paper ready for recording operation.

12. Apparatus of claim 11 wherein said means for setting causes said recording paper to move along said travelling path over a first predetermined distance in the forward direction, causes said recording paper to be cut by said means for cutting and causes said recording paper to move over a second predetermined distance in the backward direction when said switch is actuated with the presence of said first signal.

13. Apparatus of claim 1 further comprising:
a switch; and
means for generating a second signal when said switch is actuated while at least one of said first and second detecting means is detecting absence of said recording paper.

14. Apparatus of claim 13 further comprising means responsive to said second signal to produce a second sound having a second predetermined frequency.

15. Apparatus of claim 14 wherein said second sound is an alarm sound.

16. Apparatus of claim 14 wherein said switch is so mounted to be operated by the motion of a part of a housing of said apparatus.

* * * * *

UNITED STATES PATENT AND TRADEMARK OFFICE
CERTIFICATE OF CORRECTION

PATENT NO. : 4,560,990

DATED : December 24, 1985

INVENTOR(S) : Sue Takaji et al

It is certified that error appears in the above-identified patent and that said Letters Patent is hereby corrected as shown below:

On the title page:

--The Assignment information (Assignee) is misspelled.
The Assignee should be as follows:

RICOH COMPANY, LTD. --

Signed and Sealed this

Twenty-fifth Day of March 1986

[SEAL]

Attest:

DONALD J. QUIGG

Attesting Officer

Commissioner of Patents and Trademarks